(12) United States Patent
Braun et al.

(10) Patent No.: US 11,397,775 B2
(45) Date of Patent: Jul. 26, 2022

(54) USER INTERFACE FOR EVALUATING THE QUALITY OF GEOSPATIAL DATA

(71) Applicant: Axim Geospatial, LLC, Sun Prairie, WI (US)

(72) Inventors: Paul Braun, Middleton, WI (US); Daniel Frye, New Glarus, WI (US)

(73) Assignee: Axim Geospatial, LLC, Sun Prairie, WI (US)

( * ) Notice: Subject to any disclaimer, the term of this patent is extended or adjusted under 35 U.S.C. 154(b) by 343 days.

(21) Appl. No.: 16/422,774

(22) Filed: May 24, 2019

(65) Prior Publication Data

US 2020/0372072 A1     Nov. 26, 2020

(51) Int. Cl.
*G06F 16/904*     (2019.01)
*G06F 17/18*     (2006.01)
*G06F 16/29*     (2019.01)

(52) U.S. Cl.
CPC ............ *G06F 16/904* (2019.01); *G06F 16/29* (2019.01); *G06F 17/18* (2013.01)

(58) Field of Classification Search
CPC ............................... G06F 16/904; G06F 16/29
See application file for complete search history.

(56) References Cited

U.S. PATENT DOCUMENTS

| | | | |
|---|---|---|---|
| 8,484,199 B1 | 7/2013 | Katragadda | |
| 10,349,208 B1 | 7/2019 | Liang | |
| 2007/0297683 A1 | 12/2007 | Luo | |
| 2016/0019419 A1 | 1/2016 | Chen | |
| 2016/0239709 A1 | 8/2016 | Shriver | |
| 2017/0127233 A1 | 5/2017 | Liang | |
| 2017/0371883 A1* | 12/2017 | Bailiang | ............... G06F 3/0482 |
| 2018/0143998 A1* | 5/2018 | Prahladka | ............... G06F 16/29 |
| 2019/0007793 A1 | 1/2019 | Liang | |
| 2019/0045331 A1 | 2/2019 | Liang | |
| 2019/0285420 A1* | 9/2019 | Green | ................... G01C 21/32 |
| 2019/0320285 A1 | 10/2019 | Liang | |
| 2020/0082561 A1 | 3/2020 | Karonchyk | |
| 2020/0155881 A1 | 5/2020 | Tohidi | |
| 2020/0155882 A1 | 5/2020 | Tohidi | |
| 2020/0159397 A1 | 5/2020 | Tohidi | |
| 2020/0372072 A1 | 11/2020 | Braun | |
| 2020/0372624 A1 | 11/2020 | Braun | |

* cited by examiner

*Primary Examiner* — Baoquoc N To
(74) *Attorney, Agent, or Firm* — Morrison & Foerster LLP

(57) ABSTRACT

Graphical user interfaces (GUIs) for reviewing and evaluating geospatial data are provided. A GUI may allow a user to configure a geospatial data quality assessment system by grouping feature classes into one or more categories and selecting target quality scores for the overall data set and/or one or more categories. A GUI may display one or more review areas for a user to review and allow a user to generate one or more error calls in the review areas. A GUI may display one or more scores associated with a geospatial data set. A GUI may allow a user to modify to which category one or more feature classes are assigned. In response to an adjustment of one or more feature classes between categories, the user interfaces may display one or more updated quality scores associated with one or more categories.

7 Claims, 9 Drawing Sheets

USER INTERFACE FOR EVALUATING THE QUALITY OF GEOSPATIAL DATA

FIELD OF THE INVENTION

The present disclosure relates generally to a graphical user interface (GUI) for evaluating the quality of a geospatial data set based on an intended use of the data.

BACKGROUND OF THE INVENTION

Geospatial data is typically generated by identifying features in images captured by aerial sensors, such as cameras in satellites, airplanes, helicopters, unmanned aerial systems, or other aerial platforms. Photogrammetrists or spatial analysts typically view these images and identify desired features. A cartographer or photogrammetrist may identify a feature in an overhead image, such as a building, road, river, or lake, and create the feature in a geospatial data set, often using a software based tool. Several types of errors may arise when geospatial data is generated. For example, features in the image may be overlooked and are not placed in the geospatial data set (omission), or features may be erroneously included in the data set when no such feature exists in the real world (commission). Features placed in the geospatial data set may be subject to other types of error. A feature may be properly identified but placed in the wrong location in the data set (positional accuracy), or a feature may be properly identified and placed in the data set, but may be characterized incorrectly. For example, a feature may be characterized based on an incorrect theme (e.g. a road is incorrectly characterized as a river), or a feature may be characterized as having an incorrect attribute (e.g. a feature may be properly identified as a building, but the analyst may incorrectly classify the building as a school instead of a church).

The quality of a geospatial data set—that is, the quantity and type of errors in the data set—is typically important to creators and consumers of geospatial data sets. However, there are currently no graphical tools that enable users of geospatial data to accurately and objectively characterize the quality of a geospatial data set and assess the quality of the data set against an intended use.

SUMMARY OF THE INVENTION

In some embodiments, a first method, for reviewing quality of displayed geospatial data, is provided, the first method comprising: at an electronic system with a display: displaying a map based on a geospatial data set corresponding to a geographical area; overlaying one or more selectable review areas on the map, wherein the review areas are determined by the electronic system based on probabilities associated with a density of geospatial features associated with the geospatial data set; receiving a selection of a first selectable review area from a user; in response to receiving a selection of a first selectable review area from a user, displaying the first selectable review area; receiving an input from a user indicating that the first selectable review area has been reviewed; and in response to receiving an input from a user indicating that the first selectable review area has been reviewed, displaying the map.

In some embodiments of the first method, the one or more selectable review areas are indicated as unreviewed.

In some embodiments, the first method comprises in response to receiving an input from a user indicating that the first selectable review area has been reviewed, indicating that the first selectable review area has been reviewed.

In some embodiments, the first method comprises: receiving a selection of a second selectable review area from a user; and in response to receiving a selection of a second selectable review area from a user, displaying the second selectable review area.

In some embodiments, the first method comprises receiving an error marker input from a user at a location on the map, wherein an error marker indicates an error associated with a geospatial feature.

In some embodiments, the first method comprises: in response to receiving an error marker input, prompting a user for a description of the error marker.

In some embodiments of the first method, the description comprises feature class information.

In some embodiments of the first method, the description comprises error type information.

In some embodiments, the first method comprises displaying the error marker on the map, wherein the error marker is selectable.

In some embodiments, the first method comprises: receiving a selection of a selectable error marker from a user; and in response to receiving a selection of a selectable error marker, displaying information associated with the error marker.

In some embodiments of the first method, the displayed information comprises feature class information.

In some embodiments of the first method, the displayed information comprises error type information.

In some embodiments, a second method, for reviewing quality of displayed geospatial data, is provided, the second method comprising: at an electronic system with a display: displaying a first review area, wherein the first review area is a region of a map based on a geospatial data set corresponding to a geographical area, and the first review area is determined by the electronic system based on probabilities associated with a density of geospatial features associated with the geospatial data set; receiving an error marker input from a user at a location in the first review area, wherein the error marker indicates an error associated with a geospatial feature; and receiving an input from a user indicating that the first selectable review area has been reviewed.

In some embodiments, the second method comprises: in response to receiving an input from a user indicating that the first selectable review area has been reviewed, displaying the map; and overlaying the first review area and a second selectable review area on the map.

In some embodiments, the second method comprises: receiving a selection of the second selectable review area from a user; and in response to receiving a selection of a second selectable review area from a user, displaying the second selectable review area.

In some embodiments, the second method comprises: in response to receiving an error marker input, prompting a user for a description of the error marker.

In some embodiments of the second method, the description comprises feature class information.

In some embodiments of the second method, the description comprises error type information.

In some embodiments, the second method comprises displaying the error marker on the first review area, wherein the error marker is selectable.

In some embodiments, the second method comprises: receiving a selection of the selectable error marker from a user; and in response to receiving a selection of the selectable error marker, displaying information associated with the error marker.

In some embodiments of the second method, the displayed information comprises feature class information.

In some embodiments of the second method, the displayed information comprises error type information.

In some embodiments, a third method, for evaluating a geospatial data set, is provided, the third method comprising: at an electronic system with a display: displaying a quality score for a geospatial data set, wherein the quality score for the geospatial data set corresponds to an error rate of the data set; displaying one or more categories of selectable feature classes; displaying a quality score for each of the one or more categories of selectable feature classes, wherein the quality score a category of selectable feature classes corresponds to an error rate of feature classes associated with a category; receiving from a user a selection of a selectable feature class associated with a first category to be moved to a second category; and displaying an updated quality score for the first category and the second category.

In some embodiments, the third method comprises: receiving from a user a target quality score for the geospatial data set; and indicating whether the quality score for the geospatial data set is greater than or equal to the target quality score for the geospatial data set.

In some embodiments, the third method comprises: receiving from a user one or more target quality scores for one or more categories of selectable feature classes; and for each category of selectable feature classes, indicating whether the quality score for a category of selectable feature classes is greater than or equal to the target quality score associated with category.

In some embodiments, the third method comprises: displaying one or more categories of error types; and displaying, for each of the one or more categories of selectable feature classes, an amount of errors associated with each of the one or more categories of error types.

In some embodiments, the third method comprises: displaying an updated amount of errors associated with each of the one or more categories of error types for the first category and the second category.

In some embodiments of the third method, each of the one or more categories corresponds to a level of relevance to an intended use of the geospatial data set.

In some embodiments, a first system, for reviewing quality of displayed geospatial data, is provided, the system comprising: a display; one or more processors; memory; and one or more programs, wherein the one or more programs are stored in the memory and configured to be executed by the one or more processors, the one or more programs including instructions for: displaying a map based on a geospatial data set corresponding to a geographical area; overlaying one or more selectable review areas on the map, wherein the review areas are determined by the electronic system based on probabilities associated with a density of geospatial features associated with the geospatial data set; receiving a selection of a first selectable review area from a user; in response to receiving a selection of a first selectable review area from a user, displaying the first selectable review area; receiving an input from a user indicating that the first selectable review area has been reviewed; and in response to receiving an input from a user indicating that the first selectable review area has been reviewed, displaying the map.

In some embodiments, a second system, for reviewing quality of displayed geospatial data, is provided, the second system comprising: a display; one or more processors; memory; and one or more programs, wherein the one or more programs are stored in the memory and configured to be executed by the one or more processors, the one or more programs including instructions for: displaying a first review area, wherein the first review area is a region of a map based on a geospatial data set corresponding to a geographical area, and the first review area is determined by the electronic system based on probabilities associated with a density of geospatial features associated with the geospatial data set; receiving an error marker input from a user at a location in the first review area, wherein the error marker indicates an error associated with a geospatial feature; and receiving an input from a user indicating that the first selectable review area has been reviewed.

In some embodiments, a third system, for evaluating a geospatial data set, is provided, the third system comprising: a display; one or more processors; memory; and one or more programs, wherein the one or more programs are stored in the memory and configured to be executed by the one or more processors, the one or more programs including instructions for: displaying a quality score for a geospatial data set, wherein the quality for the geospatial data set corresponds to an error rate of the data set; displaying one or more categories of selectable feature classes; displaying a quality score for each of the one or more categories of selectable feature classes, wherein the quality score a category of selectable feature classes corresponds to an error rate of feature classes associated with a category; receiving from a user a selection of a selectable feature class associated with a first category to be moved to a second category; and displaying an updated quality score for the first category and the second category.

In some embodiments, a first non-transitory computer-readable storage medium, storing instructions for reviewing quality of displayed geospatial data, is provided, the instructions configured to be executed by one or more processors of a system comprising a display, memory, and one or more processors, the instructions configured to cause the system to: display a map based on a geospatial data set corresponding to a geographical area; overlay one or more selectable review areas on the map, wherein the review areas are determined by the electronic system based on probabilities associated with a density of geospatial features associated with the geospatial data set; receive a selection of a first selectable review area from a user; in response to receiving a selection of a first selectable review area from a user, display the first selectable review area; receiving an input from a user indicating that the first selectable review area has been reviewed; and in response to receiving an input from a user indicating that the first selectable review area has been reviewed, display the map.

In some embodiments, a second non-transitory computer-readable storage medium, storing instructions for reviewing quality of displayed geospatial data, is provided, the instructions configured to be executed by one or more processors of a system comprising a display, memory, and one or more processors, the instructions configured to cause the system to: display a first review area, wherein the first review area is a region of a map based on a geospatial data set corresponding to a geographical area, and the first review area is determined by the electronic system based on probabilities associated with a density of geospatial features associated with the geospatial data set; receive an error marker input from a user at a location in the first review area, wherein the error marker indicates an error associated with a geospatial feature; and receive an input from a user indicating that the first selectable review area has been reviewed.

In some embodiments, a third non-transitory computer-readable storage medium, storing instructions for evaluating a geospatial data set, is provided, the instructions configured to be executed by one or more processors of a system comprising a display, memory, and one or more processors, the instructions configured to cause the system to: display a quality score for a geospatial data set, wherein the quality for the geospatial data set corresponds to an error rate of the data set; display one or more categories of selectable feature classes; display a quality score for each of the one or more categories of selectable feature classes, wherein the quality score a category of selectable feature classes corresponds to an error rate of feature classes associated with a category; receive from a user a selection of a selectable feature class associated with a first category to be moved to a second category; and display an updated quality score for the first category and the second category.

DETAILED DESCRIPTION OF THE INVENTION

Figure 1:
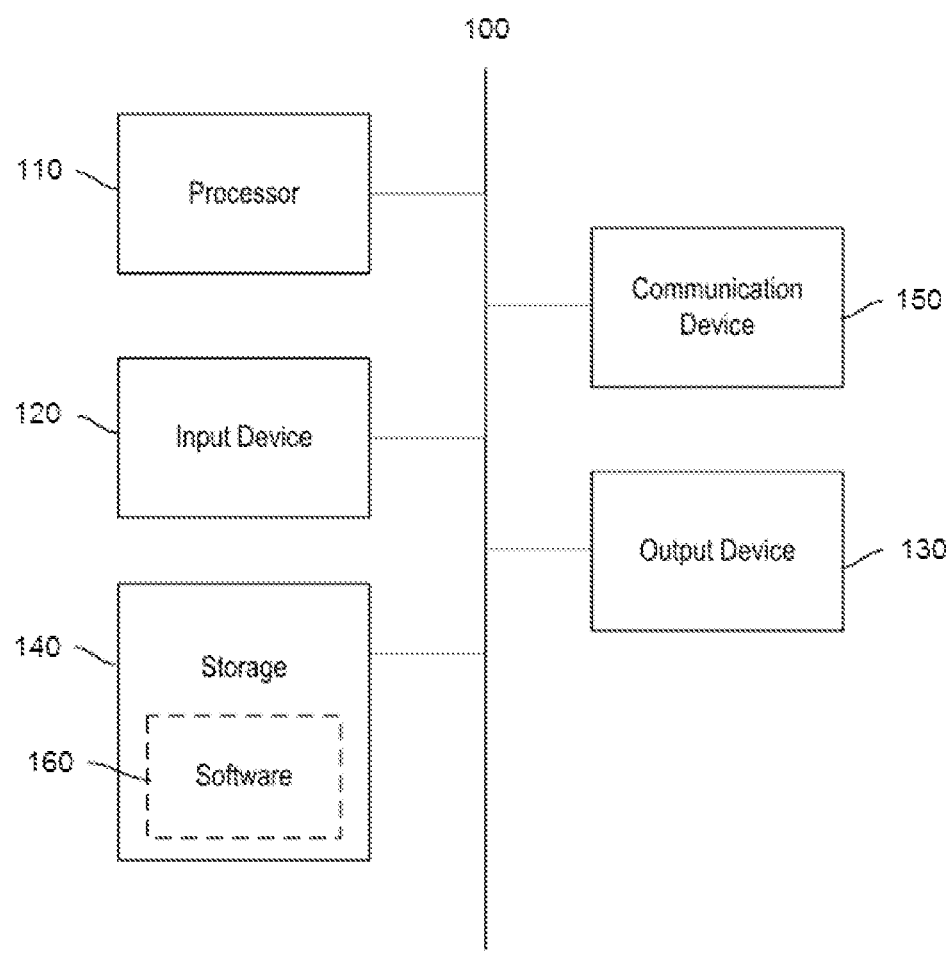
FIG. 1 is a diagram of a system for displaying a graphical user interface for reviewing and evaluating the quality of a geospatial data set, according to some embodiments.

As explained above, there is a need for a graphical user interface (GUI) that enables a user to accurately and easily review a geospatial data set and evaluate the quality of the data set based on an intended use of the data. Currently, geospatial data quality is typically determined by a reviewer receiving a data set and looking for errors. If the reviewer finds a certain number of errors, the data set may be rejected. Several problems arise with current methods; the review is inherently biased and reviewers typically do not take into account the intended purpose of the data when performing a review. For example, a data set that has many errors associated with fire hydrants may nonetheless be suitable for a delivery truck driver who only cares about roads. Under existing methods, a geospatial data set may be rejected based on errors that are not relevant to the intended use of the data set.

Current graphical user interfaces for reviewing and evaluating geospatial data sets result in inefficient review and inconsistent results. Geospatial data sets are often too large for a reviewer to review every feature for accuracy. Current methods often do not provide guidance as to how much of a data set should be reviewed in order to accurately characterize the data set as a whole and do not provide guidance to reviewers as how to organize their review. Thus, different reviewers may prioritize their review in different ways, leading to different conclusions about the quality of the data set and causing reviewers to waste time reviewing unnecessary amounts of data and/or unnecessary regions of the data set. For example, one reviewer may focus on urban areas that include a higher density of features and possible errors. Another reviewer may review a dataset based on high interest feature classes (e.g., roads or rivers) and arrive at a different conclusion about the quality of the data set.

These problems may be addressed by the GUIs described herein for reviewing and evaluating a geospatial data set. The GUIs described herein allow for accurate, consistent, and objective review and assessment of a geospatial data set by enabling a user to configure a geospatial data quality assessment system, review selected regions of a geospatial data set, and evaluate the quality of a geospatial data set based on user selectable parameters.

In one or more embodiments, the graphical user interfaces described herein may allow a user to select a geospatial data set for review. The geospatial data set may correspond to a geographic area and may include a plurality of features corresponding to real world objects or locations. Features may be grouped into feature classes. For example, features corresponding to roads may be grouped into one feature class. In one or more embodiments, the user interfaces described herein may enable a user to configure a data quality assessment system by grouping feature classes into one or more categories corresponding to the relevance of a feature class to an intended use of the data set, and selecting one or more target quality scores for the overall data set and/or one or more categories. By assigning feature classes to different categories of importance based on the feature classes' relative importance to an intended use of a geospatial data set, generated quality scores for each category may be applied toward evaluating the viability of the geospatial data set against an intended use.

Based on a statistical analysis of a distribution of features in a geospatial data set, a data quality assessment system may determine one or more regions of the data set to be reviewed for accuracy by a user. In one or more embodiments, the user interfaces described herein may display one or more review areas for a user to review. A review area may be a region of the data set being assessed. In some embodiments, the user interfaces may prompt a user to review each review area. In other embodiments, the user interfaces may allow a user to select which review areas to review and in what order. In some embodiments, the user interfaces may indicate which review areas have been reviewed and which review areas have not been reviewed. The user interfaces may enable a user to generate one or more error calls in the review areas. An error call may correspond to an error in the data set, such as omission, commission, or other error type. The user interfaces may enable a user to select a location associated with an error and input other information associated with an error, such as a feature type, feature ID, and/or other information.

Based on errors identified by a user during review, a data quality assessment system may determine one or more quality scores associated with a geospatial data set. For example, a system may determine an overall quality score for a data set and one or more quality scores for one or more categories of feature classes. The user interfaces described herein may display one or more scores associated with a geospatial data set. The user interfaces may enable a user to modify to which category one or more feature classes are assigned. In response to an adjustment of one or more feature classes between categories, the user interfaces may display one or more updated quality scores associated with one or more categories.

FIG. 1 is a diagram of a system 100 for displaying a graphical user interface for reviewing and evaluating the quality of a geospatial data set, according to some embodiments. In some embodiments, system 100 can be any suitable type of microprocessor-based device, such as a personal computer, workstation, server, videogame console, or handheld computing device, such as a phone or tablet. The system can include, for example, one or more of processor 110, input device 120, output device 130, storage 140, and communication device 150. Input device 120 and output device 130 can generally correspond to those described above and can either be connectable or integrated with the computer.

In some embodiments, system 100 can be a computer. System 100 can be a local computer or a cloud computing platform. System 100 can include multiple computers. Computers composing system 100 may be co-located or may be located in different locations. System 100 can be a host computer connected to a network. In other embodiments, system 100 can be a client computer or a server.

Input device 120 can be any suitable device that provides input, such as a touch screen or monitor, keyboard, mouse, or voice-recognition device. Output device 130 can be any suitable device that provides output, such as a touch screen, monitor, printer, disk drive, or speaker.

Storage 140 can be any suitable device that provides storage, such as an electrical, magnetic, or optical memory, including a RAM, cache, hard drive, CD-ROM drive, tape drive, or removable storage disk.

Communication device 150 can include any suitable device capable of transmitting and receiving signals over a network, such as a network interface chip or card. The components of the computer can be connected in any suitable manner, such as via a physical bus or wirelessly.

Storage 140 can be a non-transitory computer-readable storage medium comprising one or more programs, which, when executed by one or more processors, such as processor 110, cause the one or more processors to execute methods described herein, such as method 700 and/or 800 described with respect to FIGS. 7 and 8 below.

Software 160, which can be stored in storage 140 and executed by processor 110, can include, for example, the programming that embodies the functionality of the present disclosure (e.g., as embodied in the systems, computers, servers, and/or devices as described above). In some embodiments, software 160 can be implemented and executed on a combination of servers such as application servers and database servers.

Software 160, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 140, that can contain or store programming for use by or in connection with an instruction execution system, apparatus, or device.

Software 160 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

System 100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 100 can implement any operating system suitable for operating on the network. Software 160 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the geospatial data quality assessment system is not described with reference to any particular programming language. It will be appreciated that a variety of programming languages may be used to implement the teachings of the geospatial data quality assessment system as described herein.

Below, graphical user interfaces 200-600 are discussed with respect to FIGS. 2-6 in greater detail. GUIs 200-600 may, in some embodiments, be interrelated interfaces of a single program or application configured to be used in connection with one another. For example, each of the GUIs 200-600 may be different screens that are selectively accessible from an application or other computer program configured to work in conjunction with one or more electronic devices in order to review and evaluate a geospatial data set.

Figure 2:
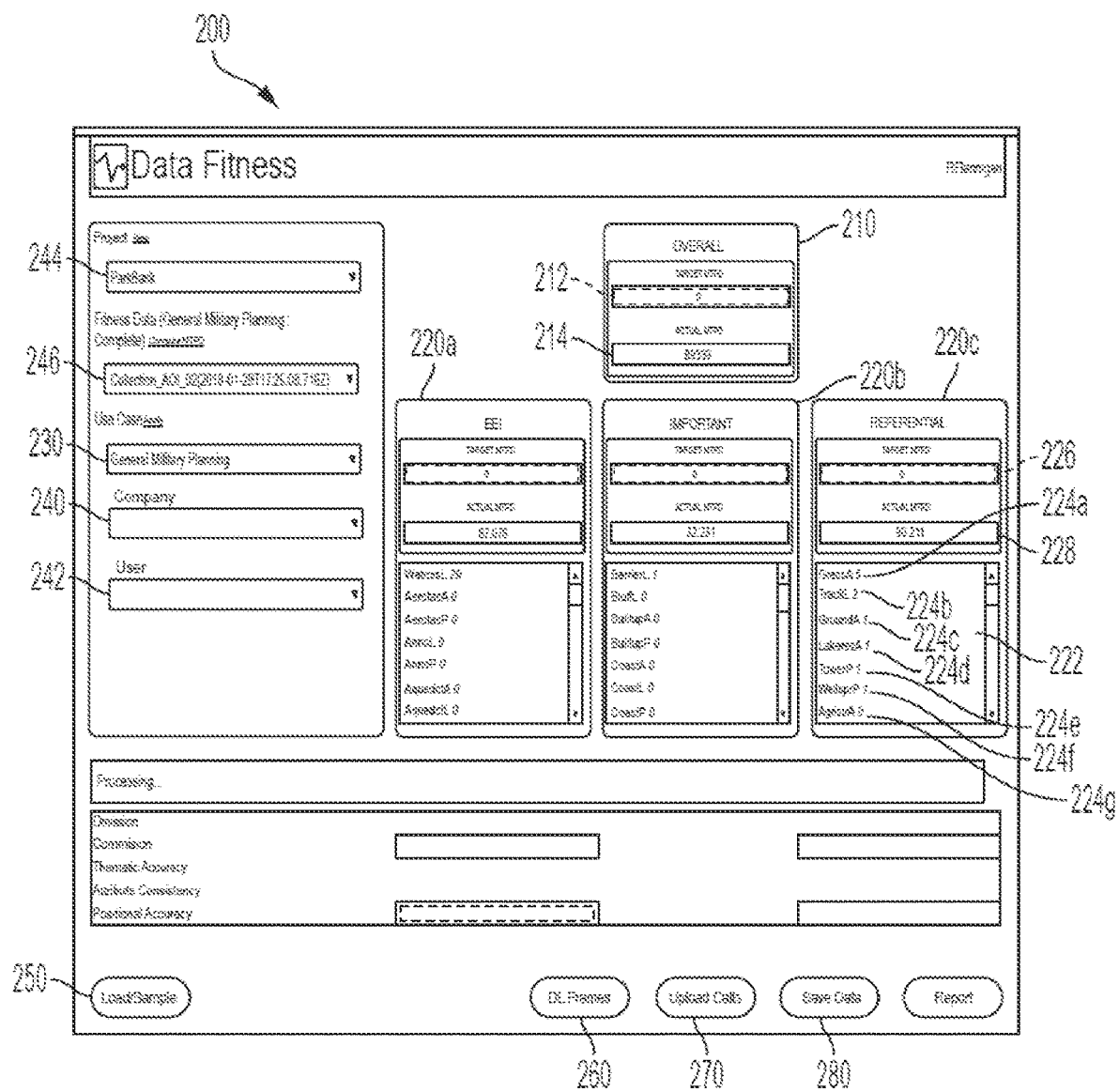
FIG. 2 is an example diagram that illustrates a GUI for configuring a geospatial data quality assessment system, according to some embodiments.

FIG. 2 is an example diagram that illustrates a GUI 200 for configuring a geospatial data quality assessment system, according to some embodiments. GUI 200 may enable a user to select a geospatial data set for review and configure a data quality assessment system. GUI 200 may enable a user to configure a data quality assessment system by grouping feature class into one or more categories corresponding to the relevance of a feature class to an intended use of the data set and selecting one or more target quality scores for the overall data set and/or one or more categories. By assigning feature classes to different categories of importance based on the feature classes' relative importance to an intended use of a geospatial data set, generated quality scores for each category may be applied toward evaluating the viability of the geospatial data set against an intended use. GUI 200 may also enable a user to upload a reviewed data set that includes one or more review areas for analysis.

GUI 200 may include an overall score field 210, and one or more feature class categories 220a-220c. Overall score field 210 may include an overall target score field 212 and an overall actual score field 214. Overall target score field 210 may be an input, such as a text field, drop down menu, or other input, that allows a user to enter a target quality score for a geospatial data set to be evaluated. Actual score field 214 may be an output configured to display a quality score of a geospatial data set after a geospatial data set has been analyzed.

Feature class categories may correspond to levels of importance of feature classes to an intended use of a geospatial data set. A geospatial data quality assessment system may generate quality scores based on each category. By assigning feature classes to different categories of importance based on the feature classes' relative importance to an intended use of a geospatial data set, generated quality scores for each category may be applied toward evaluating the viability of the geospatial data set against an intended use.

A feature class category, such as feature class category 220c, may include a list 222 of selectable feature classes 224a-224g, a category target score field 226, and a category actual score field 228. Category target score field 226 may be an input, such as a text field, drop down menu, or other input, that allows a user to enter a target quality score for feature classes included in list 222. Category actual score field 228 may be an output configured to display a quality score for feature classes in list 222 after a geospatial data set has been analyzed.

In some embodiments, overall actual score fields and category actual score fields may initially be blank. The fields may be populated with quality scores after a geospatial data set has been analyzed, such as by GUI 600 discussed below with respect to FIG. 6.

Selectable feature classes 224a-224g may be interactive affordances, in that they may be clicked, tapped, pressed, or otherwise selected in order to activate functionality. Once selected, a selectable feature class may be moved between feature class categories, such as by dragging a selected feature class from a first feature class category to second feature class category. A user may move more than one feature class between categories simultaneously, such as by selecting multiple feature classes in a first category and dragging the selected feature classes to a second category.

GUI 200 may also include a use case field 230. Use case field 230 may be an input, such as a text field, drop-down menu, wheel menu, check-boxes, radio buttons, or other input that allows a user to select a use case from a predefined set of use cases. A use case may correspond to a predefined assignment of selectable feature classes to feature class categories and/or a predefined selection of target scores.

In response to receiving a use case input from a user, GUI 200 may update feature class categories 220a-220c based on the user selection. GUI 200 may automatically move one or more selectable feature classes from a first feature class category to a second feature class category in accordance with a predefined assignment associated with the selected use case.

In response to receiving a use case input from a user, GUI 200 may also update one or more target score fields, such as overall target score field 210 and/or one or more category score fields 226. GUI 200 may automatically display in one or more target score fields a target quality score in accordance with predefined scores associated with the selected use case.

GUI 200 may also include one or more attributes 240-246, such as a company attribute 240, user attribute 242, a project attribute 244, and a data set attribute 246. In some embodiments, GUI 200 may prompt a user to enter and username and/or password. The GUI may then display information associated with the username entered by the user in one or more of attributes 240-246. For example, company attribute 240 may indicate a company name associated with the user's account. User attribute 242 may indicate a user's name associated with the user account, or other information uniquely identifying a user. Data set attribute 246 may indicate a geospatial data set to be analyzed. Project attribute 244 may indicate a project with which a geospatial data set is associated, such as a geospatial data set indicated in data set attribute 246. Multiple geospatial data sets may be associated with a project.

GUI 200 may include a load button 250 that upon a user's selection causes the GUI to prompt the user to select a first geospatial data set to be analyzed. The GUI may display a second user interface enabling a user to navigate to a storage location containing one or more data files comprising a geospatial data set to be analyzed. In response to the user selection, GUI 200 may update data set attribute 236 to indicate the geospatial data set selected by the user.

GUI 200 may include a download button 260 that upon a user's selection causes the GUI to prompt the user to select a storage location to which to download a second geospatial data set for review. The GUI may then download the second geospatial data set. In some embodiments, the second geospatial data set may comprise one or more selected areas of the first geospatial data set to be reviewed. In other embodiments, the second geospatial data set may comprise one or more polygons that represent one or more review areas of the first geospatial data set.

GUI 200 may also include an upload button 270 that upon a user's selection causes the GUI to prompt the user to upload a reviewed geospatial data set. For example, after a user has used the second geospatial data set to review the first geospatial data set for errors, a user may select upload button 270 to upload the reviewed data set for analysis. The data set to be uploaded may include one or more errors created by a user during review.

GUI 200 may also include a save button 280 that upon a user's selection causes the GUI to prompt the user to select a storage location to which to save a data file storing configuration entered by the user. Stored configuration information may define a new use case that may be selected later by a user. The GUI may then save a file storing configuration information entered by the user and/or the GUI may store configuration information as an entry in a database. For example, the GUI may store one or more target scores entered by the user, such as in overall target score 210 and/or one or more category target scores 226. The GUI may store information indicating to which categories a user has assigned one or more feature classes. Configuration information may be stored in a library of use cases that may be used to automatically configure GUI 200, such as by selecting stored configuration information via use case field 230.

The stored information may be used later to automatically configure GUI 200. For example, the predefined set of use cases associated with use case field 230 may be updated based on the stored configuration information. The stored information may be selected during future sessions to automatically populate GUI 200 based on the stored configuration information. Stored use cases may be shared between users within the same organization or in separate organizations to increase consistency of quality assessment between users.

Figure 3:
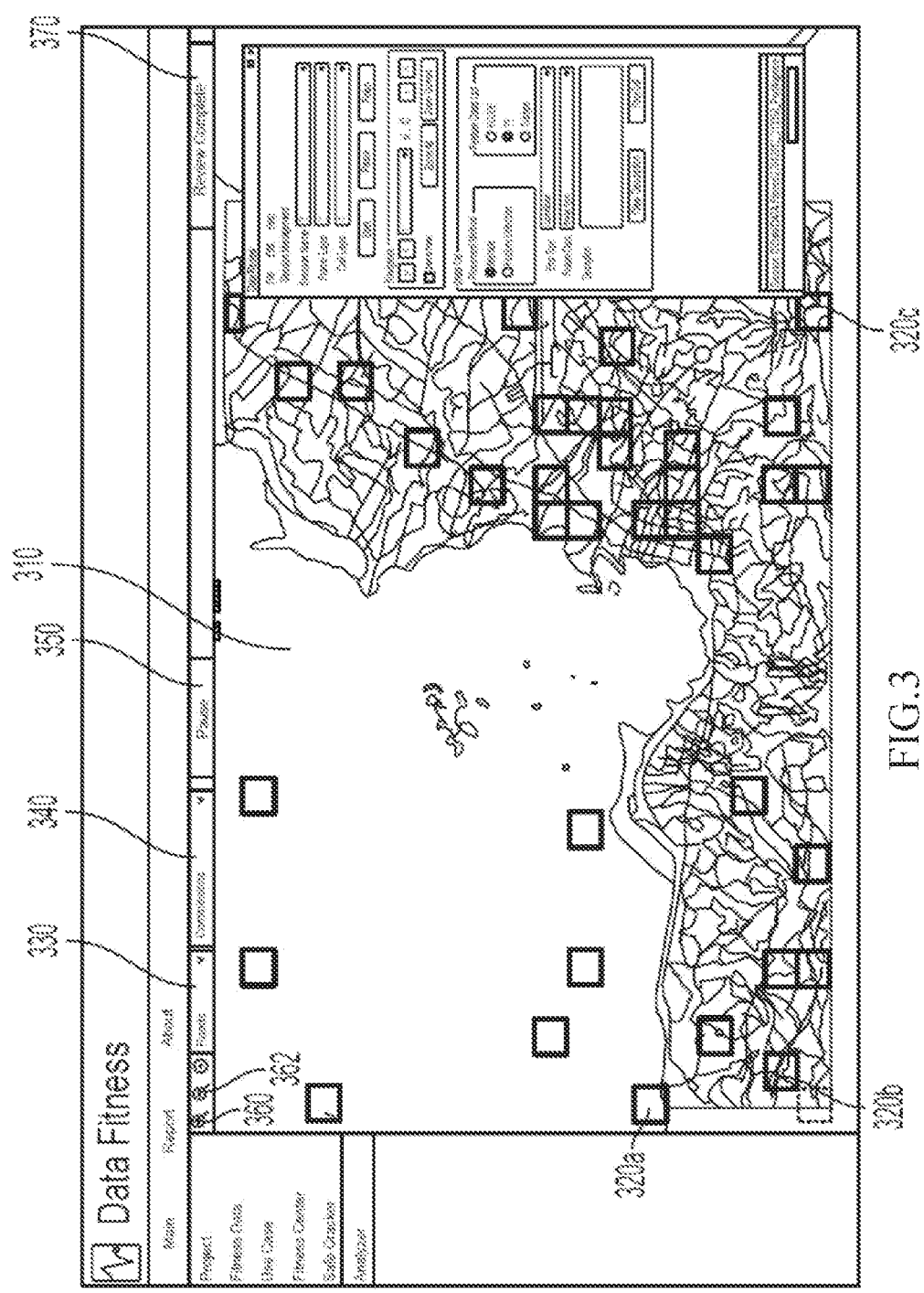
FIG. 3 is an example diagram that illustrates a GUI for reviewing geospatial data, according to some embodiments.

FIG. 3 is an example diagram that illustrates a GUI 300 for reviewing geospatial data, according to some embodiments. Based on a statistical analysis of a distribution of features in a geospatial data set, a data quality assessment system may determine one or more regions of the data set to be reviewed for accuracy by a user. In one or more embodiments, GUI 300 may display one or more review areas for a user to review. A review area may be a region of the data set being assessed. In some embodiments, GUI 300 may prompt a user to review each review area. In other embodiments, GUI 300 may allow a user to select which review areas to review and in what order. In some embodiments, GUI 300 may indicate which review areas have been reviewed and which review areas have not been reviewed. GUI 300 may enable a user to generate one or more error calls in the review areas. An error call may correspond to an error in the data set, such as omission, commission, or other error type. GUI 300 may enable a user to select a location associated with an error and input other information associated with an error, such as a feature type, feature ID, and/or other information.

A user may navigate to one or more review areas and create error calls at locations where errors are identified.

GUI 300 may include a map 310 and one or more selectable review areas 320*a*-320*c*. Map 310 may correspond to a geographic area. Map 310 may be based on a geospatial data set to be reviewed, such as selected in response to a user's selection of load button 240. The one or more selectable review areas may be overlaid on map 310.

GUI 300 may include a feature class field 330. Feature class field 330 may be an input, such as a text field, drop-down menu, wheel menu, check-boxes, radio buttons, or other input that allows a user to select a feature class from a pre-defined set of feature classes. In response to a user selection of a feature class, GUI 300 may update map 310 to display feature associated with the selected feature class.

GUI 300 may also include an error type field 340. Error type field 340 may be an input, such as a text field, drop-down menu, wheel menu, check-boxes, radio buttons, or other input that allows a user to select a feature class from a pre-defined set of error types. In response to a user selection of an error type, GUI 300 may update map 310 to display error calls associated with the selected error type.

GUI 300 may also include a pause button 350. In some embodiments, a data quality assessment system may track an amount of time a user spends reviewing selected review areas of a geospatial data set and/or an amount of time a user spends reviewing each selected review of a geospatial data set. In response to a user selection of pause button 350, a system may pause a timer tracking the elapsed review time of a user. In response to a second user selection of pause button 350, the system may resume tracking elapsed review time.

GUI 300 may also include a zoom in button 360 and a zoom out button 362. In response to a user selection of zoom in button 360, GUI 300 may zoom in to a selected region of map 310. A zoomed in region may correspond to a review area, or other area of map 310. In response to a user selection of zoom out button 362, GUI 300 may zoom out, such as by shrinking a first region displayed in map 310 and displaying adjacent regions. By zooming out, GUI 300 may cause one or more review areas to be displayed in map 310.

Selectable review areas 320*a*-320*c* may be interactive affordances, in that they may be clicked, tapped, pressed, or otherwise selected in order to cause GUI 300 to display a larger version of the selected review area. In some embodiments, in response to a user selection of a review area, GUI 300 may display a larger version of the selected review area by zooming in on the selected review area. In some embodiments, in response to a user selection of a review area, GUI 300 may update map 310 such that the selected review fills all of map 310. In other embodiments, in response to a user selection of a review area, GUI 300 may update map 310 such that the selected review fills a portion of map 310.

In some embodiments, the one or more selectable review areas may be indicated as unreviewed. For example, unreviewed review areas may be indicated by boundaries having a first color. In some embodiments, after a user has selected a review area, the selected review area may be indicated as reviewed. For example, reviewed review areas may be indicated by boundaries having a second color. In other embodiments, a review area may be indicated as reviewed after it has been displayed by GUI 300, such as by filling a majority of map 310. In still other embodiments, a review area may be indicated as reviewed in response to a user selection, such as of review complete button 370.

In some embodiments, rather than initially displaying substantially all of a geographic area corresponding to a geospatial data set to be reviewed, GUI 300 may initially display a first review area, such that the first review area fills a majority of map 310. In some embodiments, after a first review area has been displayed, the review area may be indicated as reviewed by GUI 300.

GUI 300 may also include a review complete button 370. A user may select review complete button 370 to indicate that the user has finished reviewing a displayed review area. In response to a user selection of review complete button 370, GUI 300 may automatically display a second review area. Alternatively, after a user has reviewed a first review area, a user may view the entire geographic area represented by the geospatial data set and all review areas, such as by selecting zoom out button 362. A user may then select a second review area.

Figure 4:
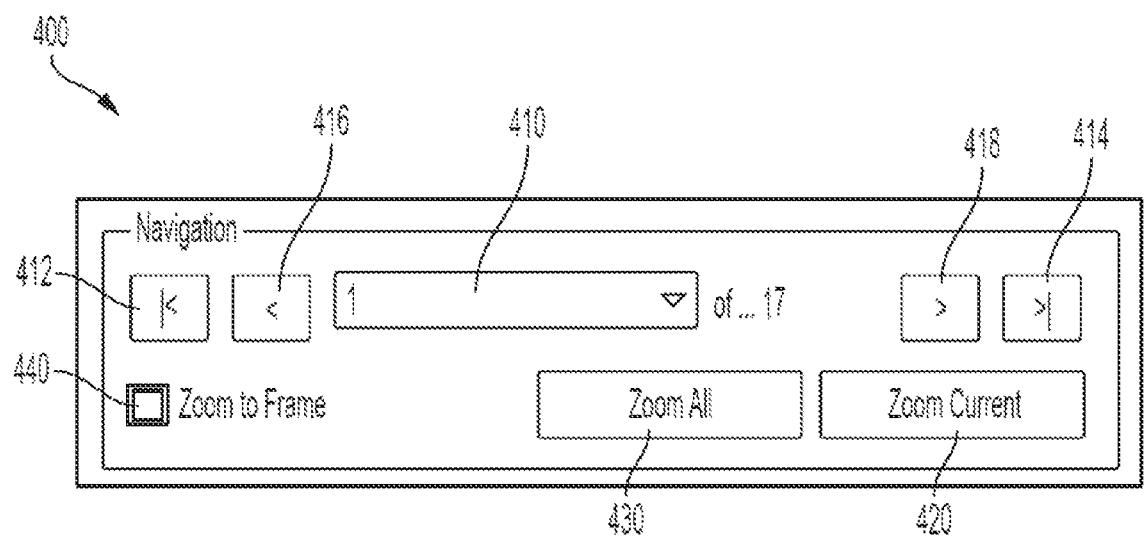
FIG. 4 is an example diagram that illustrates a GUI for navigating between review areas of a geospatial data set, according to some embodiments.

FIG. 4 is an example diagram that illustrates a GUI 400 for navigating between review areas of a geospatial data set, according to some embodiments. In some embodiments, GUI 400 may be overlaid on GUI 300.

GUI 400 includes a frame field 410 and a plurality of navigation buttons 412-418. GUI 400 includes a first frame button 412, a last frame button 414, a previous frame button 416 and a next frame button 418. Frame field 410 may be an input, such as a text field, drop-down menu, wheel menu, check-boxes, radio buttons, or other input that allows a user to select a review area. In response to a user selection, GUI 400 may update frame field 410 to indicate the review area currently selected by a user. Review areas may be stored in a predefined order. Navigation buttons 412-418 may enable a user to select a new review area based on the predefined order of review areas. First frame button 412 may be an input that, when selected by a user, causes GUI 400 to display in frame field 410 an indication that a first review area in the predefined order is currently selected. Similarly, last frame button 418 may be an input that, when selected by a user, causes GUI 400 to display in frame field 410 an indication that a last review area in the predefined order is currently selected. Previous frame button 414 may be an input that, when selected by a user, causes GUI 400 to display in frame field 410 an indication that a review area immediately preceding a current review area in the predefined order is selected. Finally, next frame button 416 may be an input that, when selected by a user, causes GUI 400 to display in frame field 410 an indication that a review area immediately subsequent to a current review area in the predefined order is selected.

GUI 400 also includes a zoom current button 420. In response to a user selection of zoom current button 420, GUI 300 may update map 310 to display a review area currently selected in frame field 410. GUI 400 also includes a zoom all button 430. In response to a user selection of zoom all button 420, GUI 300 may update map 310 to display a wide view of the geographic area represented by the geospatial data set being reviewed, such that all review areas are displayed in map 310.

GUI 400 also includes a zoom to frame field 440. Zoom to frame field 440 may be an input, such as a check box or radio button. If zoom to frame field 440 is selected, GUI 300 may display a selected review frame such that the review area fills all of map 310 upon a user selection of zoom current button 420. If zoom to frame field 440 is not selected, GUI 300 may display a selected review frame such that the review area fills a majority, but not all, of map 310 upon a user selection of zoom current button 420.

Figure 5:
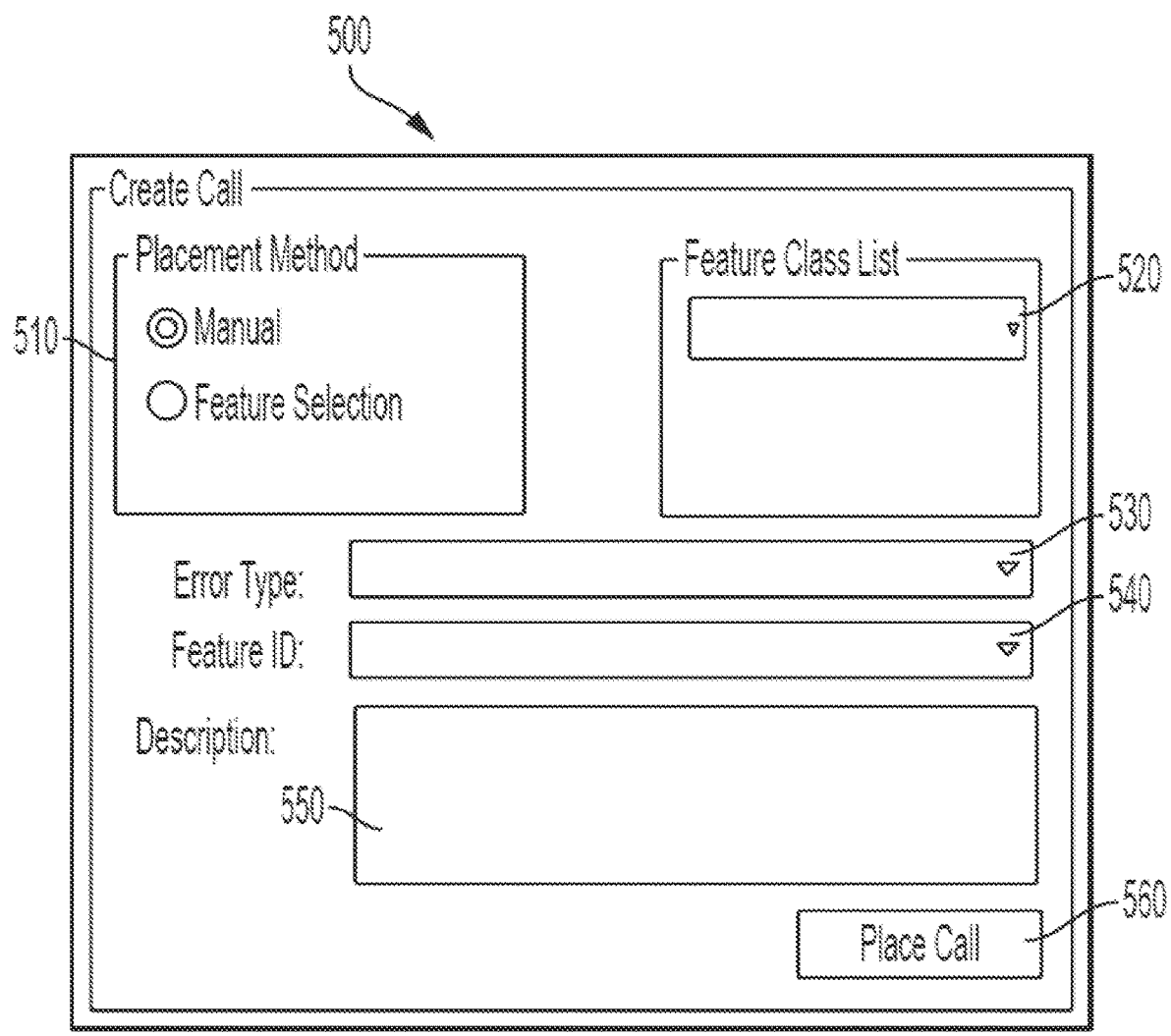
FIG. 5 is an example diagram that illustrates a GUI for creating an error call in a geospatial data set, according to some embodiments.

FIG. 5 is an example diagram that illustrates a GUI 500 for creating an error call in a geospatial data set, according to some embodiments. An error call may indicate an error associated with a feature. In some embodiments, GUI 500 may be overlaid on GUI 300. In other embodiments, GUI 500 may be displayed in response to receiving an error call input from a user at a location in GUI 300, such as on map 310. For example, in some embodiments, a user may click, double click, tap, press, or otherwise select a location, such as on map 310, to indicate that the user wishes to create an error call at the selected location. In response to a user selection of an error location, GUI 500 may be displayed to enable the user to create an error call.

GUI 500 may prompt a user for a description of the error call. GUI 500 may include a plurality of fields for receiving information about an error call, such as a placement method field 510, a feature class field 520, an error type field 530, a feature ID field 540, and a description field 550.

Placement method field 510 may be an input, such as check boxes, radio buttons, or other input that allow a user to select a placement method from a predefined list of placement methods. For example, a placement method may be manual or based on feature selection. When a manual placement is selected, a user may generate an error call at a location in the data set by selecting the location, such as by clicking, tapping, or otherwise selecting the location. When a feature selection placement is selected, a user may generate an error call by selecting a feature, such as by clicking, tapping, or otherwise selecting the feature. In response to selection of a first feature at a location by a user, a user interface, such as GUI 300, may highlight the selected feature. A user may confirm the selected feature, such as by left clicking the feature, or reject the feature, such as by right clicking the feature. In response to receiving confirmation of a feature from a user, a user interface, such as GUI 300, may display an interface for creating an error call, such as GUI 500. In response to receiving a rejection of a feature from a user, a user interface, such as GUI 300, may de-highlight the first feature and highlight a second feature at the location, which may be confirmed or rejected by a user. If no additional features exist at the location after a feature has been rejected, all features may be de-selected and de-highlighted.

Feature class field 520 may be an input, such as a text field, drop down menu, or other input, that allows a user to select a feature class type from a predefined list of feature classes to be associated with an error call.

Similarly, error type field 530 may be an input, such as a text field, drop down menu, or other input, that allows a user to select an error type from a predefined list of error types to be associated with an error call. For example, a user may select an error of omission, commission, classification correctness, attribute correctness, positional accuracy, or other error type.

Feature ID field 540 may be an input, such as a text field, drop down menu, or other input, that allows a user to select a unique ID for a feature with which an error is associated. In some embodiments, the ID may correspond to a feature class associated with the error.

Description field 550 may be an input, such as a text field, that allows a user to input additional information regarding an error call to be created. For example, a user may input a justification for creating an error call or providing additional information, such as linking to online resources.

GUI 500 may also include a place call button 560 that when selected by a user causes GUI 300 to place an error call on map 310 based on the parameters selected by a user in GUI 500.

In some embodiments, placed error calls may be selectable, such as by a user. In response to receiving a selection of a selectable error call by a user, GUI 300 may display information associated with the selectable error call. For example, GUI 300 may display feature class information, error type information, feature ID information, or other information associated with a selected error call.

Figure 6:
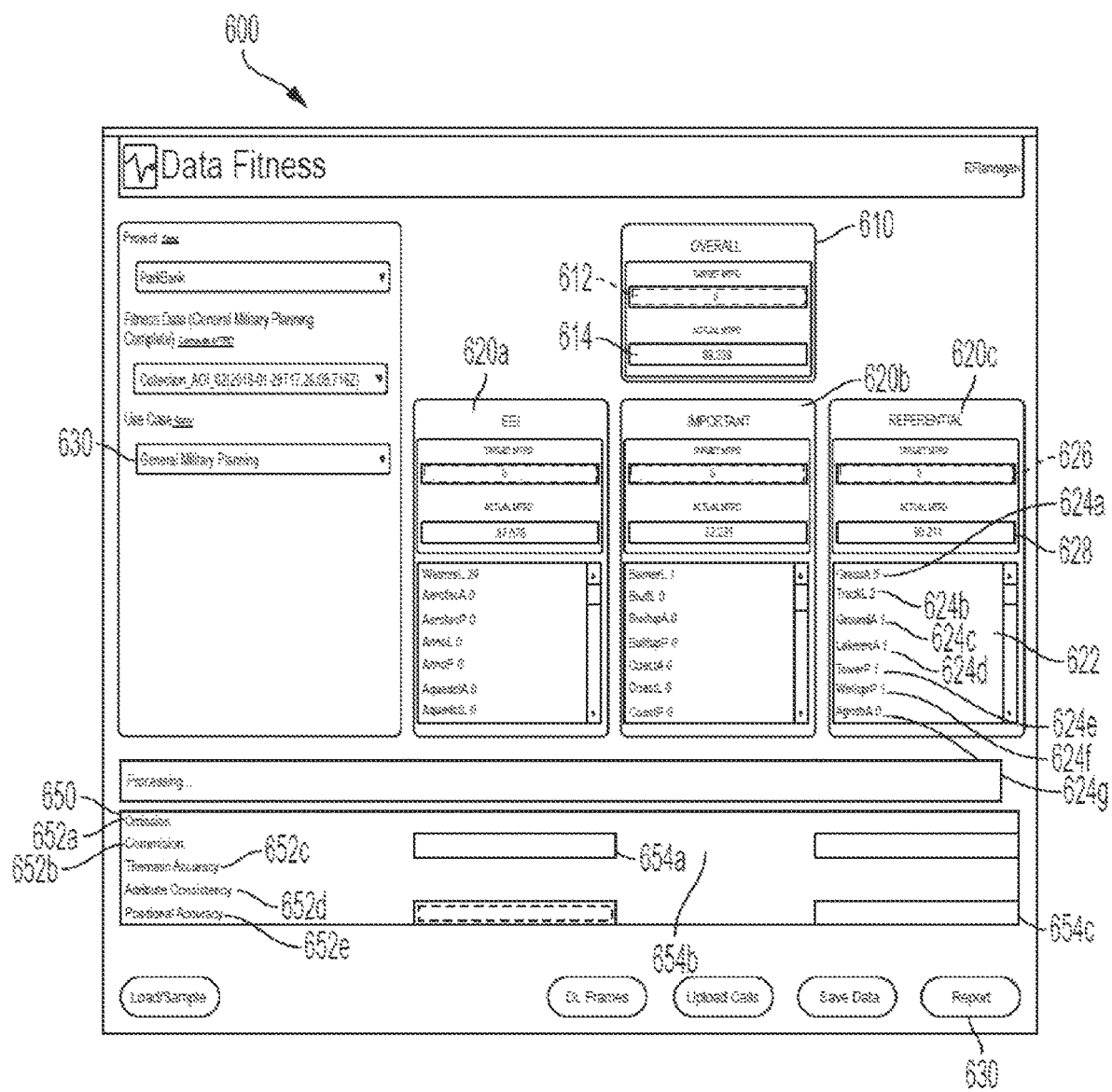
FIG. 6 is an example diagram that illustrates a GUI for evaluating geospatial data quality, according to some embodiments.

FIG. 6 is an example diagram that illustrates a GUI 600 for evaluating geospatial data quality, according to some embodiments. Based on errors identified by a user during review, a data quality assessment system may determine one or more quality scores associated with a geospatial data set. For example, a system may determine an overall quality score for a data set and one or more quality scores for one or more categories of feature classes. GUI 600 may display one or more scores associated with a geospatial data set. GUI 600 may enable a user to modify to which category one or more feature classes are assigned. In response to an adjustment of one or more feature classes between categories, GUI 600 may display one or more updated quality scores associated with one or more categories. GUI 600 may also display information indicating an amount of one or more error types are associated with one or more categories of feature classes.

GUI 600 may correspond to GUI 200 for configuring a geospatial data quality assessment system. GUI 600 may be an updated version of GUI 200 based on results of an analysis of a geospatial data set.

GUI 600 may include substantially similar features as GUI 200. GUI 600 may include an overall score field 610, and one or more feature class categories 620*a*-620*c*.

Overall score field 610 may include an overall target score field 612 and an overall actual score field 614. Overall target score field 610 may be an input, such as a text field, drop down menu, or other input, that allows a user to enter a target quality score for a geospatial data set to be evaluated. Actual score field 614 may be an output configured to display a quality score associated with a geospatial data set that has been analyzed.

GUI 600 may be configured to indicate whether an actual score is greater than or equal to an associated target score. For example, if an actual score is greater than or equal to an associated target score, GUI 600 may display the actual score and/or the associated target score as a first color. If an actual score is less than an associated target score, GUI 600 may display the actual score and/or the target score as a second color. In response to receiving an updated target score input from a user, GUI 600 may update an indication associated with the target score and associated actual score. For example, if a user modifies a target score that was less than an actual score to be greater than the actual score, GUI 600 may so indicate, such as by changing a color associated with the target score and/or actual score.

A feature class category, such as feature class category 620c, may include a list 622 of selectable feature classes 624a-224g, a category target score field 626, and a category actual score field 628. Category target score field 626 may be an input, such as a text field, drop down menu, or other input, that allows a user to enter a target quality score for feature classes included in list 622. Category actual score field 628 may be an output configured to display a quality score associated with feature classes in list 622 for a geospatial data set that has been analyzed.

Selectable feature classes 624a-624g may be interactive affordances, in that they may be clicked, tapped, pressed, or otherwise selected in order to activate functionality. Once selected, a selectable feature class may be moved between feature class categories, such as by dragging a selected feature class from a first feature class category to second feature class category. A user may move more than one feature class between categories simultaneously, such as by selecting multiple feature classes in a first category and dragging the selected feature classes to a second category.

In some embodiments, GUI 600 may update one or more quality score fields in response to a user moving one or more feature classes between categories. For example, in response to a user moving a feature class from a first category to a second category, GUI 600 may update actual quality scores associated with the first and second category. GUI 600 may also update one or more indications of whether one or more actual scores is greater than or equal to one or more associated target scores based on the feature class adjustment. For example, if removing a feature class from a first category causes the category's actual score to become greater than the category's target score, GUI 600 may so indicate, such as by updating a color associated with the actual score and/or the target score.

GUI 600 may also include a use case field 630. Use case field 630 may be an input, such as a text field, drop-down menu, wheel menu, check-boxes, radio buttons, or other input that allows a user to select a use case from a predefined set of use cases. In response to receiving a use case input from a user, GUI 600 may update feature class categories 620a-620c based on the user selection. GUI 600 may automatically move one or more selectable feature classes from a first feature class category to a second feature class category in accordance with a predefined assignment associated with the selected use case. In response to receiving a use case selection from a user, GUI 600 may update one or more quality score fields if the use case selection causes one or more feature classes to be moved from a first category to a second category. GUI 600 may update one or more quality score fields based on the feature class adjustment. GUI 600 may also update one or more indications of whether one or more actual scores is greater than or equal to one or more associated target scores in response to receiving a use case selection from a user. For example, if removing a feature class from a first category causes the category's actual score to become greater than the category's target score, GUI 600 may so indicate, such as by updating a color associated with the actual score and/or the target score.

In response to receiving a use case input from a user, GUI 600 may also update one or more target score fields, such as overall target score field 610 and/or one or more category score fields 626. GUI 600 may automatically display in one or more target score fields a target quality score in accordance with predefined scores associated with the selected use case. GUI 600 may update indications associated with one or more target scores and corresponding actual scores based on the target score adjustments. For example, GUI 600 may update one or more target scores and associated actual scores to indicate whether the adjusted target score is greater than or equal to an associated actual score.

GUI 600 may include a report button 630 that upon a user's selection causes the GUI to prompt the user to select a storage location to which to download an output based on the displayed assessment. The GUI may then download the output. The output may include information corresponding to the data quality assessment. For example, the output may include one or more quality scores and associated target scores, one or more lists of error types found during review of the geospatial data set, and/or one or more items indicating whether one or more quality scores is greater than or less than a corresponding target score.

The output may also include information regarding the review of the selected regions. For example, the output may include a list of errors identified during review and corresponding information, such as error type, location, and/or information regarding the corresponding feature, such as feature class, attribute, or other characteristic. The output may also indicate the identity of the reviewer, the total time spent reviewing, the time spent reviewing each selected region, whether the reviewer visited each selected region, or other information. The output may include the number of errors corresponding to each feature class.

GUI 600 may also include a load button 640 that upon a user's selection causes the GUI to prompt the user to select a new geospatial data set for review. In response to receiving a selection of a new geospatial data set to be reviewed, GUI 600 may reinitiate the data assessment system, such as by removing values from quality score and/or actual score fields, and/or updating one or more feature class categories and associated selectable feature classes, such as based on the selected data set or based on a default setting. In response to receiving a selection of a new geospatial data set to be reviewed, GUI 200 may be displayed to configure a second analysis.

GUI 600 may also include an error type field 650. Error type field 650 may include a plurality of error types 652a-652e and a plurality of error fields 654a-654c. Error types may include omission, commission, thematic accuracy, attribute consistency, positional accuracy, or other error type. Each error field may correspond to an error type and a feature class category. GUI 600 may display in each error field an amount of errors associated with the error type and feature class category to which the error field corresponds. For example, one or more error fields may be an output configured to display a number of errors associated with a feature class category of the corresponding error type. Additionally or alternatively, one or more error fields may be displayed as a color corresponding to an amount of errors associated with a feature class category of the corresponding error type. In this way, error type field 650 may visually indicate which error types contribute most to an amount of errors associated with each feature class category.

Figure 7A:
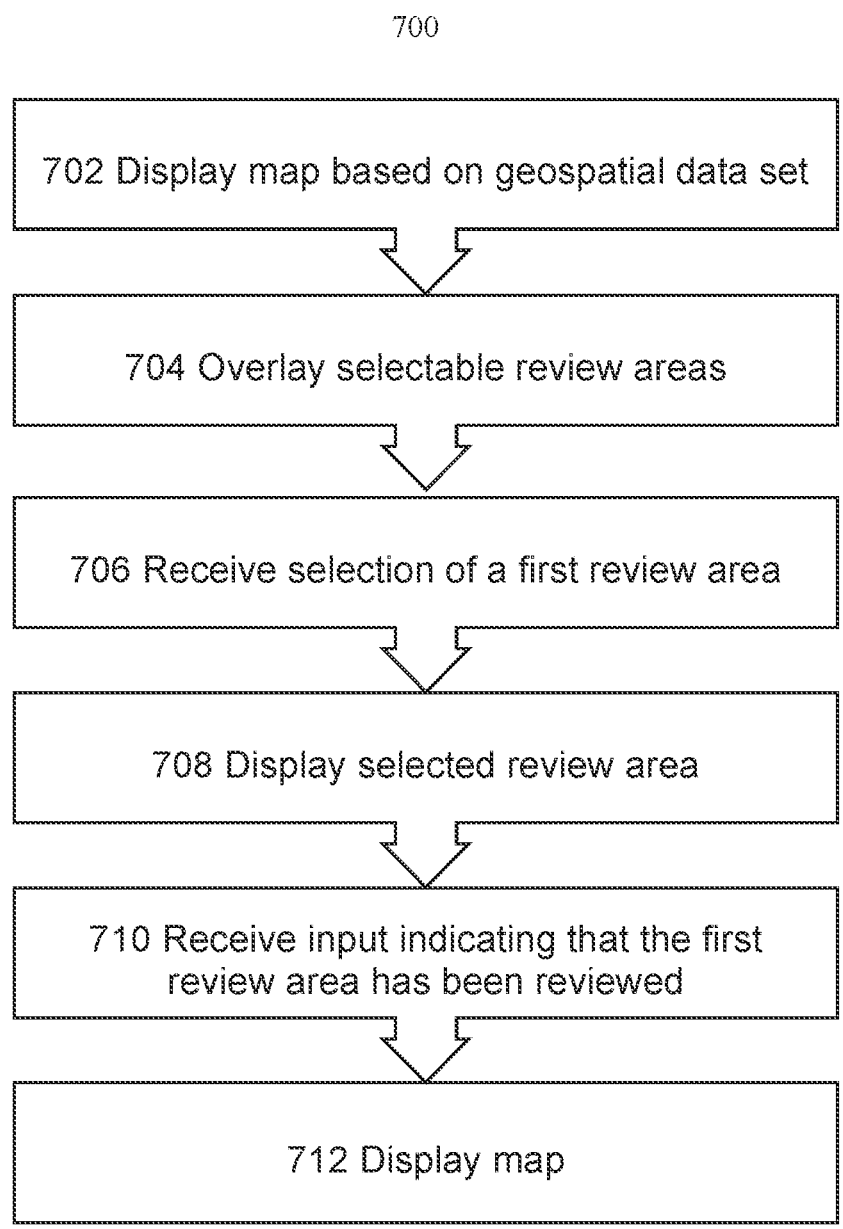
FIGS. 7A and 7B are flowcharts that illustrate methods for reviewing quality of displayed geospatial data, according to some embodiments.

FIG. 7A is a first flowchart 700 that illustrates a method for reviewing quality of displayed geospatial data, according to some embodiments.

At step 702, a map based on a geospatial data set may be displayed. The map may correspond to a geographic area represented by the geospatial data set.

At step 704, one or more selectable review areas may be overlaid on the map.

At step 706, a selection of a first selectable review area may be received.

At step 708, in response to receiving a selection of a first selectable review area, the first selectable review area may be displayed.

At step 710, an input indicating that the first selectable review area has been reviewed.

At step 712, the map may be displayed.

Figure 7B:
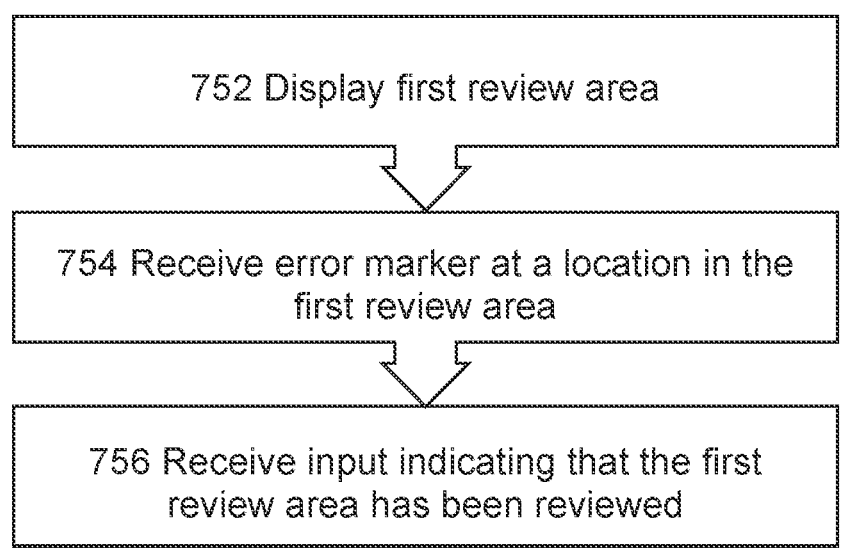

FIG. 7B is a second flowchart 750 that illustrates a method for reviewing quality of displayed geospatial data, according to some embodiments.

At step 752, a first review area may be displayed.

At step 754, an error marker at a location in the first review area may be received.

At step 756, an input may be received indicating that the first review area has been reviewed.

Figure 8:
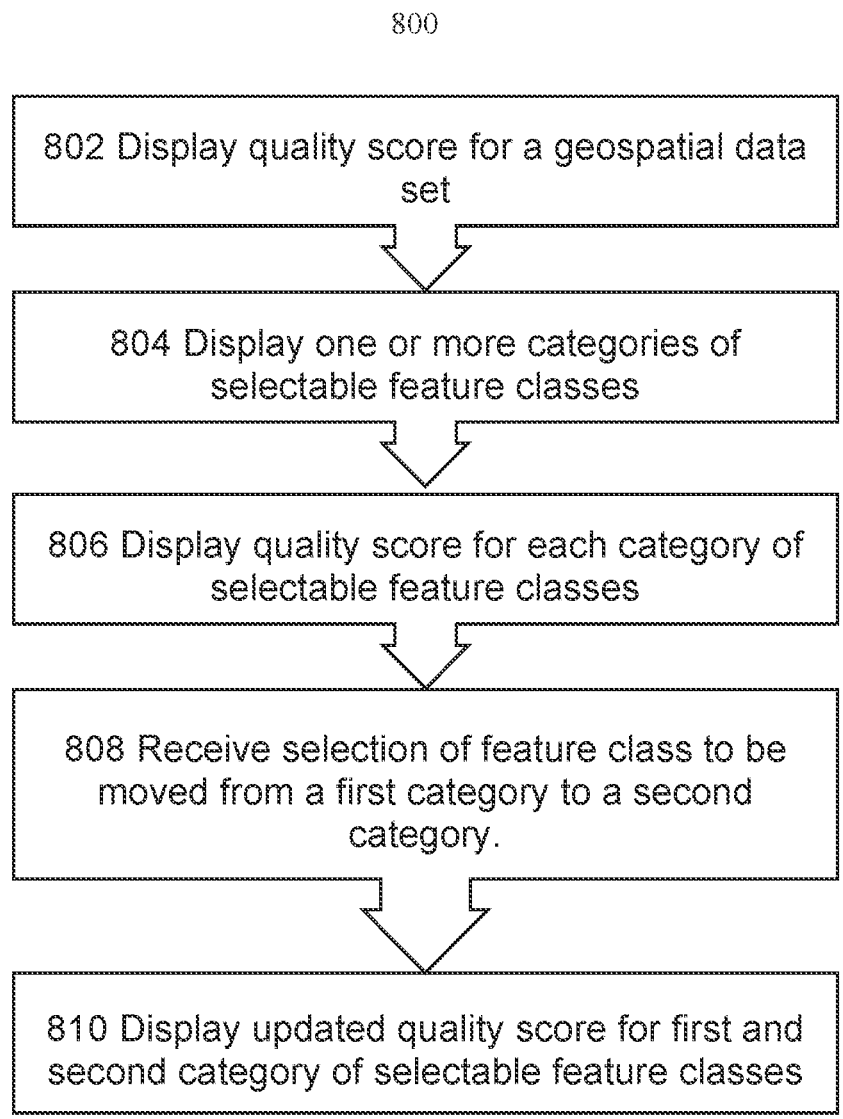
FIG. 8 is a flowchart that illustrates a method for evaluating a geospatial data set, according to some embodiments.

FIG. 8 is a flowchart that illustrates a method for evaluating a geospatial data set, according to some embodiments.

At step 802, a quality score for a geospatial data set may be displayed.

At step 804, one or more categories of selectable feature classes may be displayed.

At step 806, a quality score may be displayed for each category of selectable feature classes.

At step 808, a selection of feature classes to be moved from a first category to a second category may be received.

At step 810, an updated quality score for the first and second categories may be displayed.

The foregoing description sets forth exemplary methods, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another. In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

The invention claimed is:

1. A method for evaluating a geospatial data set, comprising:
at an electronic system with a display:
displaying a quality score for a geospatial data set, wherein the quality score for the geospatial data set corresponds to an error rate of the data set;
displaying one or more categories of selectable feature classes;
displaying a quality score for each of the one or more categories of selectable feature classes, wherein the quality score a category of selectable feature classes corresponds to an error rate of feature classes associated with a category;
receiving from a user a selection of a selectable feature class associated with a first category to be moved to a second category; and displaying an updated quality score for the first category and the second category.

2. The method of claim 1, comprising:
receiving from a user a target quality score for the geospatial data set;
indicating whether the quality score for the geospatial data set is greater than or equal to the target quality score for the geospatial data set.

3. The method of claim 1, comprising:
receiving from a user one or more target quality scores for one or more categories of selectable feature classes; and
for each category of selectable feature classes, indicating whether the quality score for a category of selectable feature classes is greater than or equal to the target quality score associated with category.

4. The method of claim 1, further comprising:
displaying one or more categories of error types; and
displaying, for each of the one or more categories of selectable feature classes, an amount of errors associated with each of the one or more categories of error types.

5. The method of claim 1, further comprising displaying an updated amount of errors associated with each of the one or more categories of error types for the first category and the second category.

6. The method of claim 1, wherein each of the one or more categories corresponds to a level of relevance to an intended use of the geospatial data set.

7. A system for evaluating a geospatial data set, comprising:
a display;
one or more processors;
memory; and
one or more programs, wherein the one or more programs are stored in the memory and configured to be executed by the one or more processors, the one or more programs including instructions for:
displaying a quality score for a geospatial data set, wherein the quality for the geospatial data set corresponds to an error rate of the data set;
displaying one or more categories of selectable feature classes;
displaying a quality score for each of the one or more categories of selectable feature classes, wherein the quality score a category of selectable feature classes corresponds to an error rate of feature classes associated with a category;
receiving from a user a selection of a selectable feature class associated with a first category to be moved to a second category; and
displaying an updated quality score for the first category and the second category.

* * * * *